E. H. McCLOUD.
MECHANISM FOR RAISING AND LOWERING SHUTTERS OR CURTAINS.
APPLICATION FILED SEPT. 27, 1911.

1,158,824.

Patented Nov. 2, 1915.
8 SHEETS—SHEET 3.

Witnesses
Benj. Finckel
Mayme Foard

Inventor
Edward H. McCloud
by Finckel & Finckel
his Attorneys

E. H. McCLOUD.
MECHANISM FOR RAISING AND LOWERING SHUTTERS OR CURTAINS.
APPLICATION FILED SEPT. 27, 1911.

1,158,824.

Patented Nov. 2, 1915.
8 SHEETS—SHEET 5.

Witnesses
Benj. Finckel
Mayme Foard

Inventor
Edward H. McCloud
by Finckel & Finckel
his Attorneys

E. H. McCLOUD.
MECHANISM FOR RAISING AND LOWERING SHUTTERS OR CURTAINS.
APPLICATION FILED SEPT. 27, 1911.

1,158,824.

Patented Nov. 2, 1915.

Witnesses

Inventor
Edward H. McCloud
by
his Attorneys

UNITED STATES PATENT OFFICE.

EDWARD H. McCLOUD, OF COLUMBUS, OHIO, ASSIGNOR TO THE KINNEAR MANUFACTURING COMPANY, OF COLUMBUS, OHIO, A CORPORATION OF WEST VIRGINIA.

MECHANISM FOR RAISING AND LOWERING SHUTTERS OR CURTAINS.

1,158,824.   Specification of Letters Patent.   Patented Nov. 2, 1915.

Original application filed March 4, 1908, Serial No. 419,211. Divided and this application filed September 27, 1911. Serial No. 651,538.

*To all whom it may concern:*

Be it known that I, EDWARD H. MCCLOUD, a citizen of the United States, residing at Columbus, in the county of Franklin and State of Ohio, have invented a certain new and useful Improvement in Mechanism for Raising and Lowering Shutters or Curtains, of which the following is a specification.

The principal object of this invention is to provide means whereby rolling shutters or curtains can be operated to roll up or unroll them either manually or automatically by power (preferably electric power) and, where there is a plurality of curtains or shutters arranged in a series, whereby either or any of them may be so operated independently of the others.

The invention consists in the elements and combinations of elements hereinafter described and then particularly pointed out in the appended claims, the invention not being confined in its embodiment to the forms of the parts shown in the accompanying drawings and specifically set forth in the description.

In said drawings Fig. 3 is mainly a horizontal section on the line $x$—$x$ Fig. 2, illustrating the clutch for connecting the main operating shaft through suitable gearing with the roller. Fig. 3$^a$ is a vertical section of one of the clutch members on the line $t$—$t$ Fig. 3, to illustrate the construction of the clutch. Fig. 13 is a sectional view looking up on the line $u$—$u$ Fig. 12. Fig. 13$^a$ is a detail illustrating stops on the hook and base of the circuit-breaking and reversing switch.

In the views 15 designates the horizontal member of the power shaft, which for convenience in assembling the parts is made up of sections united by suitable couplings, as seen at 15$^a$, so as to form a continuous shaft from which power can be taken for operating any of a plurality of curtains 90, 90$^a$ arranged in conjunction with it.

Figure 1:
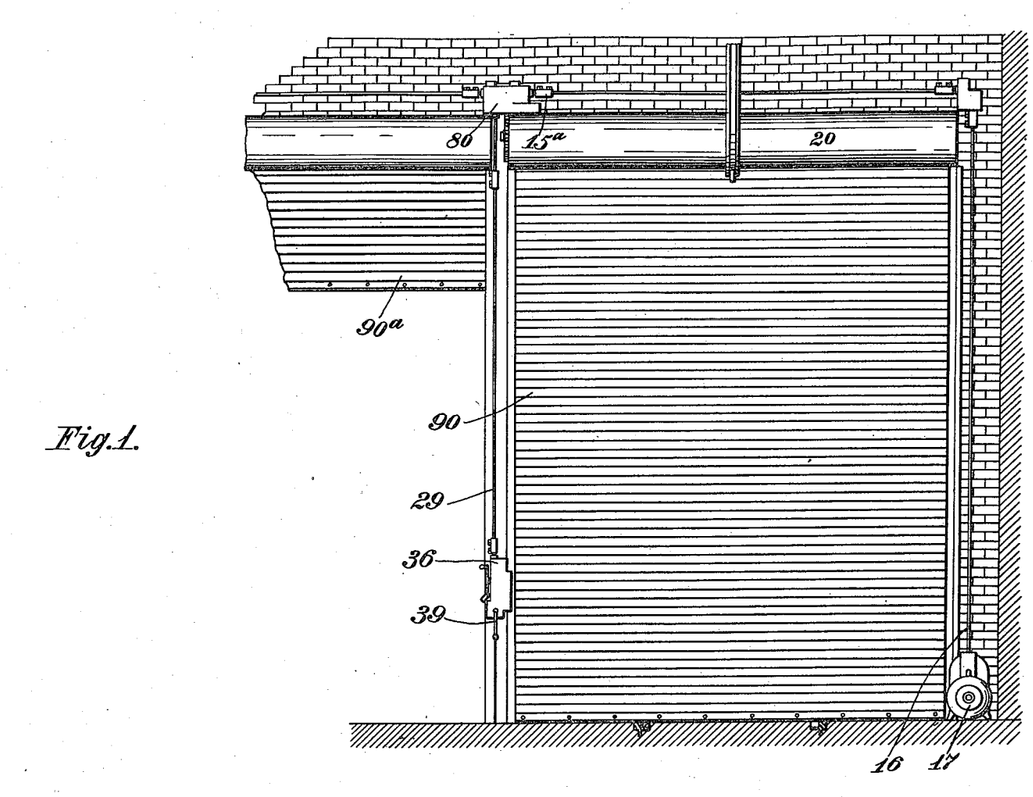
—Figure 1 is a general view (fractional in part) showing a building equipped with the shutters or curtains and the arrangement of the apparatus for operating them.
Figure 2:
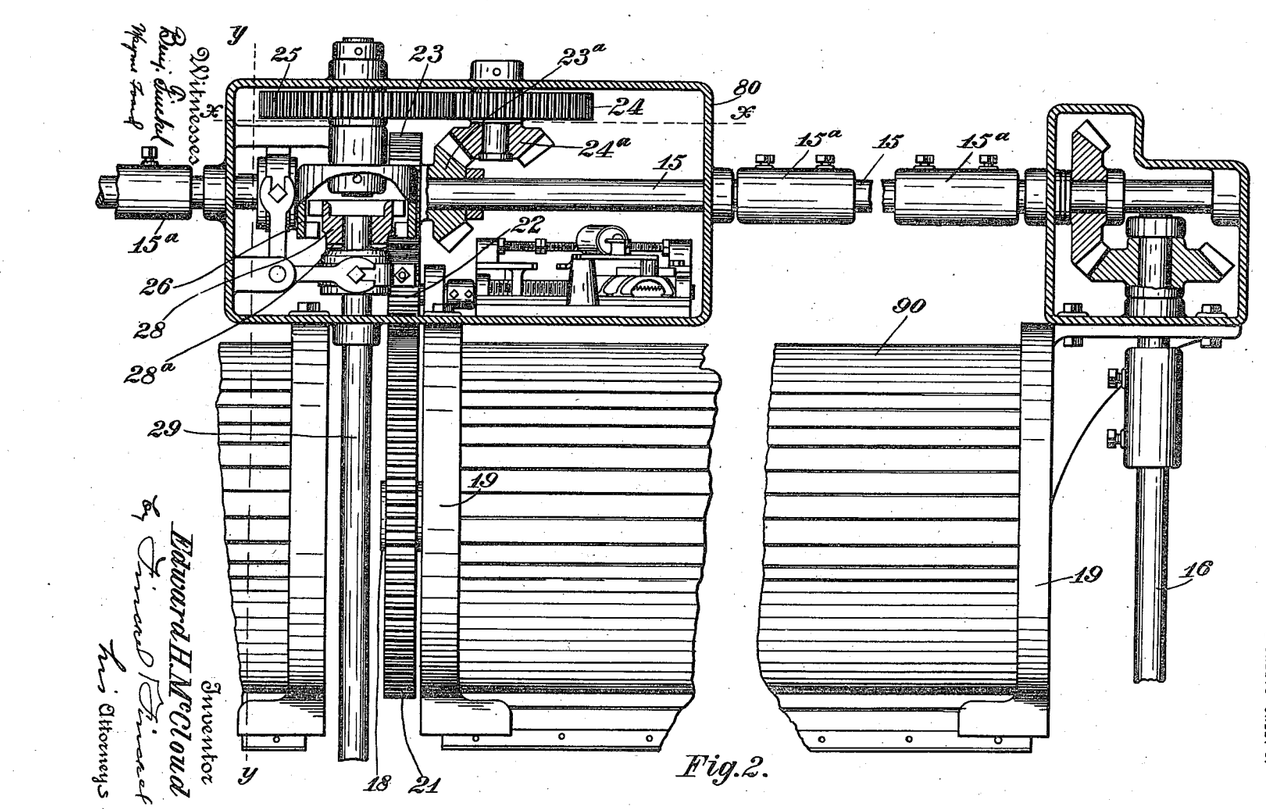
Fig. 2 is a view on a larger scale and partially in elevation and partially in section to illustrate more particularly the curtain roller, the horizontal member of the operating or power shaft, the gearing, the clutching device for operating a roller manually, and the devices for reversing the motion of the power shaft. In this view the roller and horizontal member of the power shaft are broken out vertically.
Figure 10:
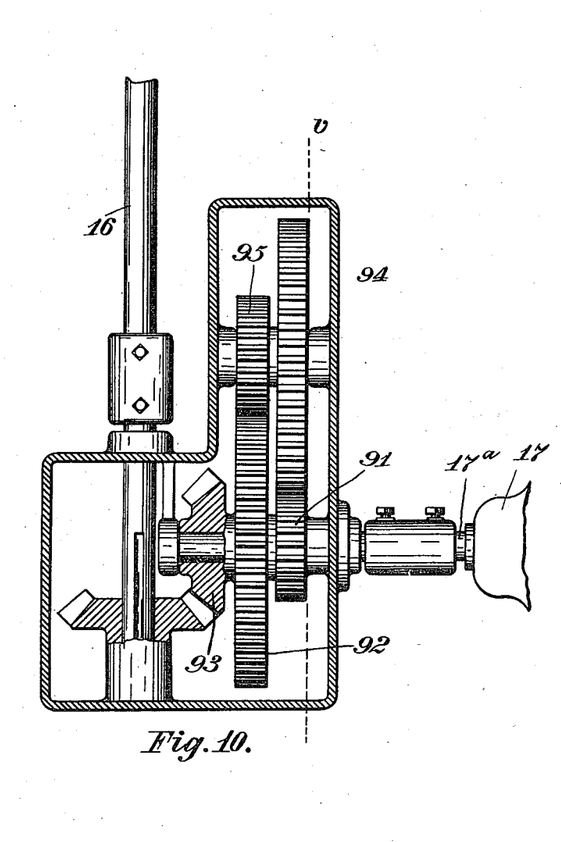
Fig. 10 is a detail illustrating an edge view and partial section the gearing between the electric power motor and the vertical member of the lower shafts.
Figure 11:
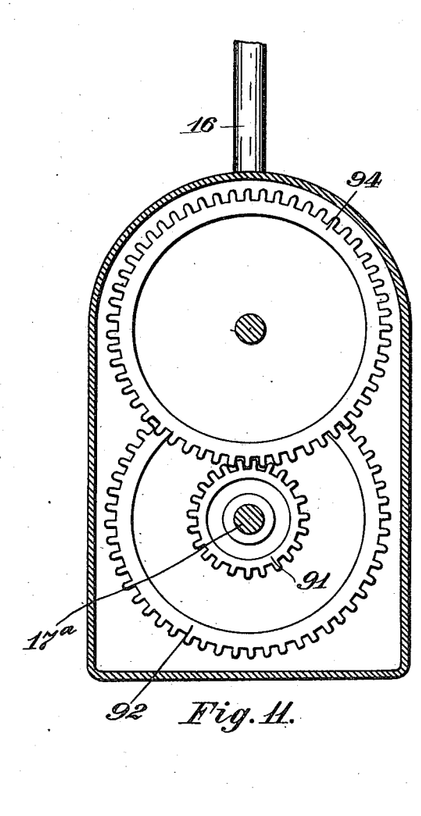
Fig. 11 is a vertical sectional view taken on the line $v$—$v$ Fig. 10.

16 designates the vertical member of the power shaft, which is suitably geared, see Fig. 2, at its upper end with an end of the horizontal member 15, and has at its lower end suitable gearing connecting it with the driven shaft 17$^a$ of an electric motor 17 Fig. 10. If the driven shaft of the motor is run with great speed, gearing for reducing the speed in the shaft, well understood, can be included in the connection between the motor shaft and the vertical member 16 of the power shaft. An instance of reducing gearing is depicted in Figs. 10 and 11, said gearing comprising a pinion 91, fixed on the shaft 17$^a$, and a large gear wheel, 92, having cast with it a miter gear 93, loose on said shaft; a large gear 94 and a pinion 95, both fixed on a supplemental shaft to mesh with the pinion 91 and large gear 92 respectively; and a miter gear 96 keyed on the power shaft 16 to mesh with the mitre gear 93. The curtain-roller shaft 18 is journaled in suitable end brackets, as seen at 19, between which is wound the curtain 90, the latter being protected by a hood 20 secured on the brackets, see Fig 1. One end of each roller shaft has secured to it a large spur gear 21 that is engaged by a smaller gear 22 which in turn operates the circuit-breaking and reversing mechanism (see Fig. 2). The gear 22 is engaged by a gear 23 loose on the shaft 15, said gear 23 having cast with or attached to it a miter gear $23^a$ that is engaged by a suitable gear $24^a$ attached to or cast with a large gear 24 journaled in a housing 80 for all these parts. The large gear 24 is engaged by a large gear 25 also journaled in the said housing, said gear 25 having secured to move with it the external vertical clutch member 26 (see Fig. 4). The gear 23 has formed or cast to turn with it the horizontal external clutch member 27 (see Fig. 3).

Figures 3, 3A:
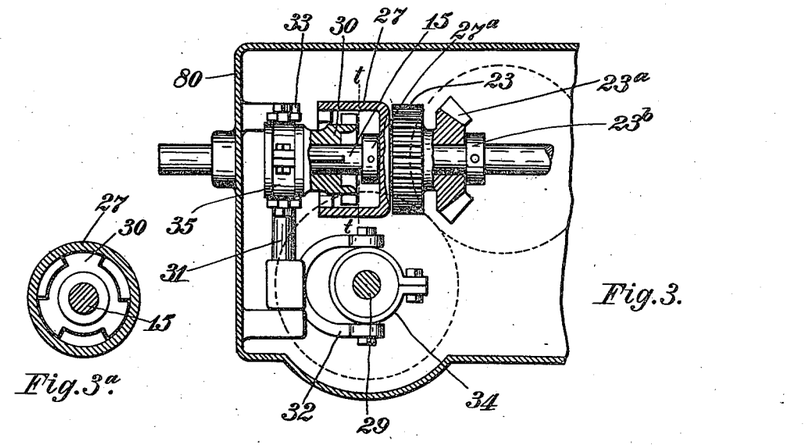
Figure 4:
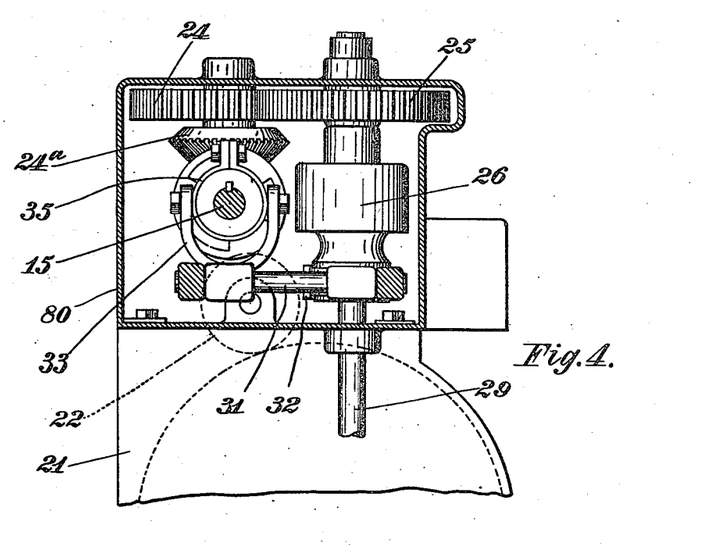
Fig. 4 is a vertical section on the line $y$—$y$ Fig. 2, illustrating the two clutches referred to in the description of Figs. 2 and 3 and the means for operating them.

The gear 23, miter $23^a$ and horizontal clutch member 27 are held from sliding on the shaft 15 between collars $27^a$ and $23^b$.

29 designates the manually operated shaft. There is one of these shafts 29 for each shutter or curtain and it is vertically mounted near the edge of the curtain. Pinned at $28^a$ to the shaft 29 is a vertical internal clutch member 28 that coöperates, when properly moved, with the vertical external clutch member 26. The character 30 designates a horizontal internal clutch member slidably keyed to the horizontal shaft member 15 to coöperate, when properly moved, with the horizontal external clutch member 27. The clutch member 30 is connected to be operated with the vertical movements of the shaft 29 by means of a bell-crank lever comprising a shaft 31 journaled in the housing 80 and having fixed thereon fork arms 32 and 33 engaging straps 34 and 35 in grooves in the vertical and horizontal internal clutch members respectively, said clutch members being keyed to turn with but slide on said shafts. The arrangement of the clutch members with reference to each other is such that when the vertical or manual shaft 29 is raised to its uppermost position the teeth of the horizontal clutch members are engaged with each other, and when said shaft is in its lowermost position the teeth of the vertical clutch members are engaged with each other, there being an intermediate position in which the teeth of both the horizontal and vertical clutch members are disengaged. This last position I denominate the neutral position. When the horizontal clutch members are engaged, motion can be imparted to the curtain roller through the gears 23 by the operation of the power shaft 15, in which case the large gears 24 and 25 run idle. This position of the clutches I denominate the power position. When the vertical clutch members are engaged, motion can be imparted to the curtain roller by manual operation of the vertical shaft 29 through the chain of gears 25, 24, $24^a$, $23^a$, 23 and 22. This position I denominate manual.

Figures 5, 6:
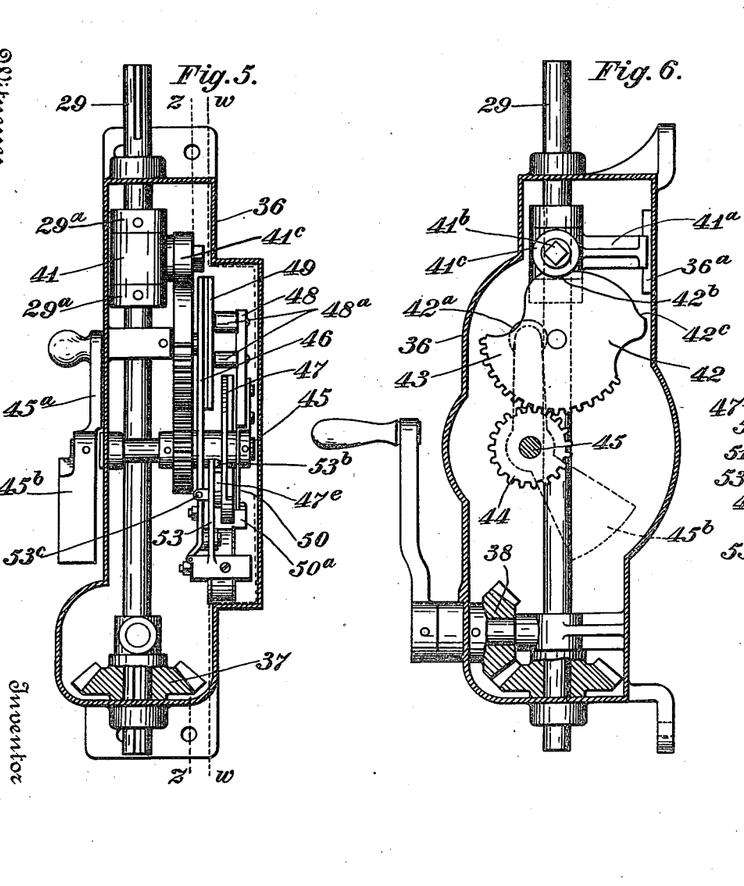
Fig. 5 is a view of the controller mechanism at its left-hand side, as viewed in Fig. 6, with a portion of the casing removed, and with the gears at the lower end of the vertical manual shaft in section, the cam in said view being in what I shall hereinafter designate the neutral position.
Fig. 6 is a view in section from the front and mainly on the line $z$—$z$ Fig. 5 to show the cam for shifting the shiftable clutch members to change from manual to power operation, said view also showing the cam in the neutral position.
Figure 8:
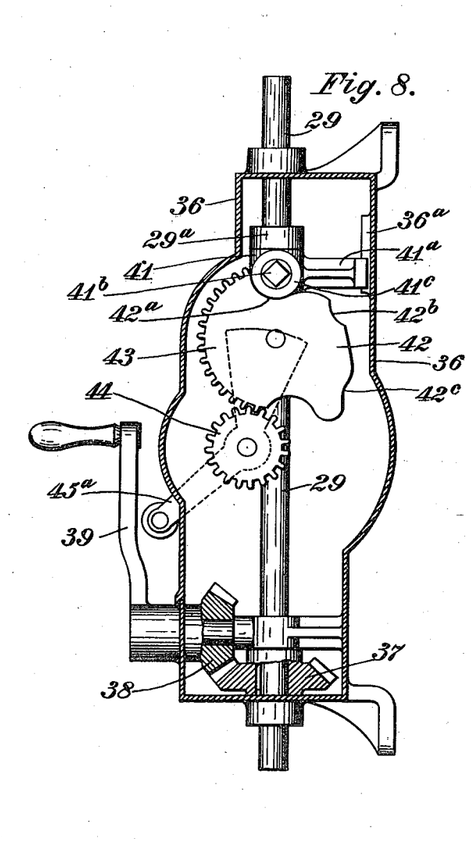
Fig. 8 is a view of the kind shown in Fig. 6 showing the clutch-shifting cam in the position of manual operation.
Figure 9:
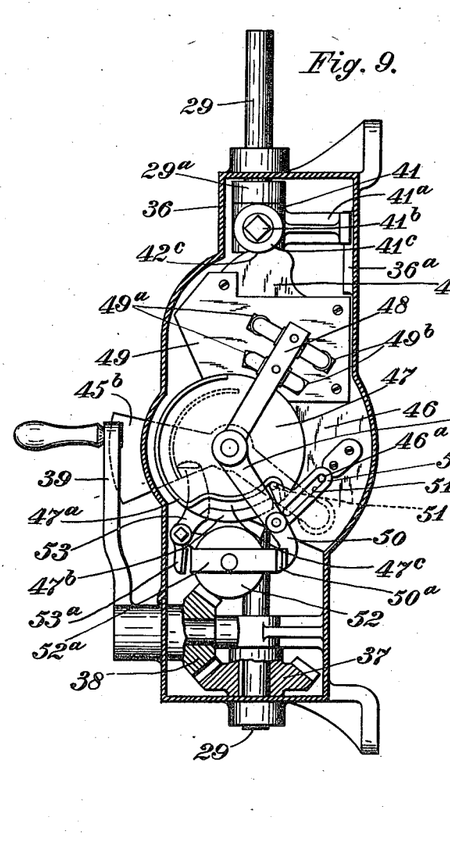
Fig. 9 is a view like Fig. 7 showing the clutch-shifting cam and the other cognate parts in electrical or power-operating position.

The lower end of the vertical or manual shaft 29 projects into a housing 36 secured on the wall of the building containing the openings to be closed by the shutters and so as to be within easy reach of the operator. On the lower end of said shaft within said housing is a miter gear 37 engaged by a similar gear 38 adapted to be turned by a handled crank 39 at the outer side of the housing. There is provided an ordinary spline-and-groove connection between the shaft 29 and gear 37 so that the shaft can be raised and lowered in said gear. See Figs. 5 to 9 inclusive. On the shaft 29 in the upper part of the housing 36 and between fixed collars $29^a$ is a loose sleeve 41 having an arm $41^a$ the end of which is grooved to engage a fixed vertical tongue $36^a$ on the housing 36 to keep said sleeve from turning. The sleeve 41 is furnished with a forwardly-projecting journal $41^b$ on which is an anti-friction roller $41^c$. Suitably journaled to the housing under the anti-friction roller $41^c$ is a member having a cam edge 42 and a toothed sector edge 43. The cam edge has three seats $42^a$, $42^b$ and $42^c$ at unequal distances from the axis of the member 42—43 to support the anti-friction roller $41^c$ and therefore the shaft 29 in three different positions vertically. The first seat $42^a$ sustains the shaft 29 in that position where the teeth of the vertical clutch members 26 and 28 only are engaged with each other and therefore in the position for manual operation of the curtain roller by the revolution of the crank 39. The second seat $42^b$ sustains the shaft 29 in the intermediate or neutral position, that is, where the teeth of both the vertical and horizontal clutches are disengaged from each other. And the third seat $42^c$ sustains the shaft 29 in that position where the teeth of the horizontal clutch members 27 and 30 only are engaged with each other and therefore in the position for power operation of the curtain roller upon the energization of the driving motor 17. Engaging the toothed sector portion 43 is a pinion 44 secured on a shaft 45 suitably journaled in the housing, said shaft being provided at the rear of the housing with a crank $45^a$ for operating said shaft. (See Figs. 5 and 8). Extending from the shaft 45 in a direction opposing that of the crank is a weight arm 45$^b$. Formed within the casing parallel with the front and back walls thereof is a wall 46 in which the forward portion of the shaft 45 is journaled. Secured on the shaft 45 forward of said wall is a disk-like structure 47 having at and near its rim on its forward side a rib 47$^a$, said rib forming in conjunction with another shorter rib 47$^b$ a groove or passage 47$^c$ in the forward face of the disk, said passage being open at both ends. But intercepting said passage 47$^c$ at its normally upper end is a spring-held pawl 47$^d$ that opens outward only, or so as to permit a pin, hereinafter referred to, to pass out of the groove 47$^c$ but not into it from the rim at that end. Loose on the shaft 45 forward of the disk 47 is a circuit-closing device that includes an arm 48 that carries at its end two pairs of circuit-closing contacts 48$^a$ and 48$^b$ that coöperate with two pairs of circuit-closing contacts 49$^a$ and 49$^b$ on a plate of insulating material 49 secured to the wall 46. The other part of the circuit-closing device is an arm 50 that has an armature 50$^a$ at its lower end. Hinged to the arm 50 is a dog 51 having a slot 51$^a$ engaged by a stationary pin 46$^a$ on the wall 46 and on said dog is a pin 51$^b$ adapted to be engaged by the channel or passage 47$^c$. The character 52 designates an electromagnet having a double pole piece 52$^a$, said pole piece at one side, when the magnet is energized, attracting and holding the armature 50$^a$ and therefore the contacts on the arm 48 in the operating circuit-closing position, as best shown in Fig. 9.

Figure 7:
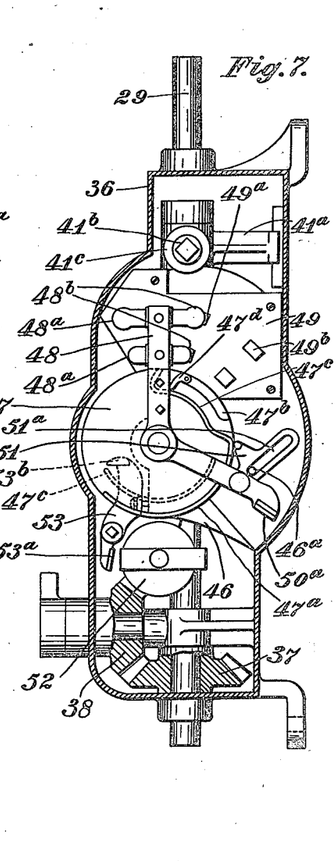
Fig. 7 is a view of the controller mechanism on the line $w$—$w$ Fig. 5 with the cam in the same position, the forward part of the casing being removed.

During the first movement of the disk 47 from the position seen in Fig. 7 the pin 51$^b$ enters the passage 47$^c$ and upon further movement of said disk the circuit-closing device is free to move by gravity to close the circuit through the electro-magnet, which, acting on the armature 50$^a$, holds the circuit-closing device in said circuit-closing position. But this operation takes place before the disk has been turned to the limit fixed by the engagement of the pin 51$^b$ with the wall at the upper end of the passage beyond the pawl 47$^d$ and the purpose of this lost motion of the disk is to effect some operation of the power shaft and some rotation of the horizontal clutch member 30 and make certain the engagement of the teeth of the horizontal clutch members when they are finally thrown together by the further elevation of the vertical shaft to the seat 42$^c$.

When the circuit in the electro-magnet is broken, as hereinafter described, the weight 45$^b$ turns the disk in the reverse direction and by engagement of the pawl 47$^d$ with the pin 51$^b$ throws the arm 48 to the left cutting out the armature current, as seen in Fig. 7. When the disk 47 turns from the position shown in Fig. 9 to the position seen in Fig. 7 the pin 51$^b$ is acted on by the pawl 47$^d$ to restore the current closing arm 48 to vertical or circuit breaking position, after which the pin 51$^b$ passes out of the open upper end of the passage 47$^c$ and rides about the rim of the disk until it reaches the point shown in Fig. 7, the arms constituting the circuit-closing device are held until the disk is again manually operated.

The circuit connections are such that when one of the electro-magnets 52 of a plurality of curtains is energized by the manipulation of the controlling mechanism, the others are also energized, it being desirable automatically to lock from possible operation the disks 47 of the controllers of the other shutters. To effect this there is pivoted in each controller box 36 (or an extension thereof) a lever 53 having at its lower end an armature 53$^a$ and at its upper end a lateral dog or projection 53$^b$ which, when moved by the action of the electro-magnet on the armature, stands in the path of the end of a concentric arc-shaped rib 47$^e$ on the rear side of the disk 47, thus preventing said disk from turning. When the disk is first moved manually and the electro-magnet is afterward energized, as is the case when a particular shutter is to be operated, the lateral dog 53$^b$ is merely drawn down against said rib 47$^e$, and in this operation, although said dog frictionally engages said rib, it does not prevent the necessary rotation of the disk. The dog 53 has a set-screw at 53$^c$ to abut against the edge of the wall 46 to regulate the normal distance of the armature from the pole of the magnet 52.

In the power or automatic operation of a curtain it is desirable that the power be cut off when the curtain has reached its predetermined downmost or its predetermined wound-up position. In connection with the means for closing and opening the operating current I provide means whereby the operation of the motor is automatically reversed by reversing the magnetic fields of the armature so that after the curtain has been wound up and stopped and upon further operation, the motor will operate to send the curtain down, and after the curtain is down and stopped and upon further operation of the clutches, the motor will operate to wind it up.

Figure 12:
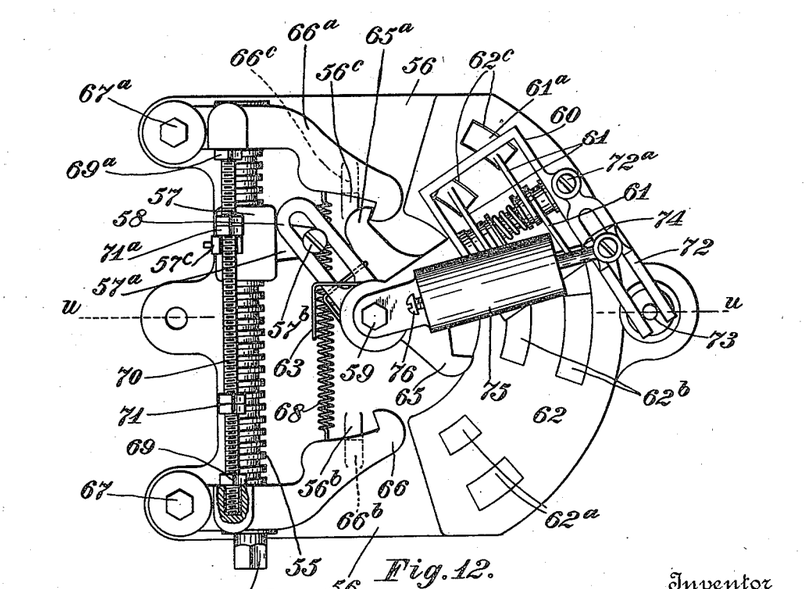
Fig. 12 is a plan view of the means operated by the curtain roller for automatically reversing the operation of the electric motor.
Figures 13, 13A:
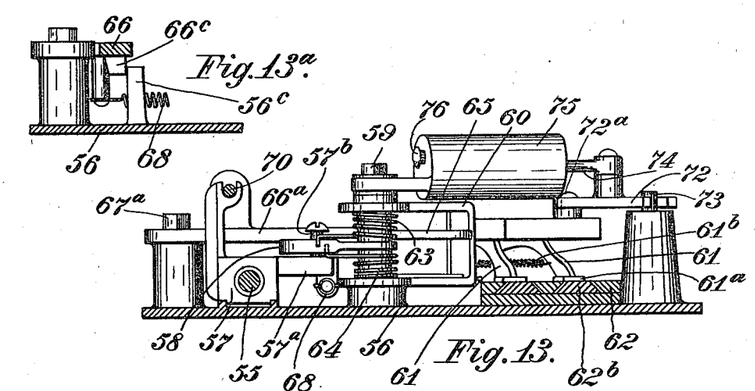

The motor-reversing mechanism is shown generally in Fig. 2 but more clearly in detail in Figs. 12 and 13. In these views 55 designates a horizontally-arranged worm shaft journaled in suitable bearings on a base plate 56. The worm shaft 55 has a squared end 55$^a$ that engages a corresponding axial hole in the small gear 22 so that the motion of said gear is imparted to said worm. On the worm shaft 55 is a nut 57 having a horizontal projection 57ª from which projects upwardly a pin 57ᵇ that enters the slot of a link 58 pivoted on a post 59. Swinging horizontally on the post 59 is a circuit-closing spider comprising a frame 60 having hingedly connected thereto four legs 61 with contacting feet or rubbers 61ª, said feet being held down by means of suitable springs 61ᵇ on an insulating bed 62, said bed containing three pairs of electrodes or contact points 62ª, 62ᵇ and 62ᶜ. The electrodes or contact points 62ª, 62ᵇ and 62ᶜ are arranged in two arcs concentric with the axis of motion of the spider frame. Encircling the post 59 are two coiled springs 63 and 64 reversely wound, one having an outwardly extending arm to bear against the spider frame to throw it in one direction, and the other having a similarly extending arm to bear against the said frame and throw it in the opposite direction. Each of the springs 63 and 64 also has an inwardly-extending arm, the inner end of which is bent to lie in the path of the link 58, one at each side of the link. Said link is swung by the pin 57ᵇ in one direction as the curtain descends and in the opposite direction as the curtain rises, and when so operated it engages the inner arm of the spring that will throw the spider frame in the opposite direction, thereby placing it under the necessary tension to perform that operation. Projecting laterally from opposite sides of the shank of the spider frame are hook members 65 and 65ª that engage hook members 66 and 66ª respectively at the predetermined limits of the movements of the spider. The hook members 66 and 66ª are pivoted on studs 67 and 67ª respectively at the rear of the base plate 56 but they are held yieldingly toward each other by a spring 68 connecting them. The hook members 66 and 66ª are limited in their predetermined distance apart or in their movement toward each other by lugs 66ᵇ and 66ᶜ on said hooks contacting with lugs 56ᵇ and 56ᶜ on the baseplate 56. The hook members 66 and 66ª work free on the ends of the threaded bar 70, and are pushed off the hooks 65 and 65ª by nuts 69 and 69ª on the bar 70. The threaded bar 70 also contains adjustable nuts 71 and 71ª (with jam nuts for securing them in adjusted position) for determining the point at which the hook members 65 and 65ª shall be released from the hook members 66 and 66ª respectively in the oscillation of the spider frame. The nut 57, also has fixed to it an upwardly projecting fore-arm, 57ᶜ, that straddles the threaded bar, 70, between the nuts 71 and 71ª. In its reciprocations, the said fork-arm 57ᶜ, alternately strikes the nuts 71 and 71ª. In this operation it will be observed therefore that it is the pressure of the nut 57 on the nut 71ª of the threaded bar 70 and the consequent movement of the latter that pushes the hook 66 or 66ª, as the case may be, off the coöperating hook member of the spider.

To properly retard the throw of the spider frame from either terminus of its movement to the other and prevent the premature making of a new or reverse circuit and sparking in the switch of the box 36, there is pivoted on the spider frame at 72ª a bifurcate arm 72 that engages a stationary pin 73 located on the bed 56 and on a radial line bisecting the arc of movement of the spider, said arm 72 having attached to it the rod 74 of a piston that works in an air cylinder 75 pivoted on the post 59. The air cylinder 75 has at its inner end a head provided with a threaded hole in which is inserted a vent-screw 76 that can be adjusted to vary the size of the air passage therein. The cylinder 75 is in the nature of a "dash pot" and when the spider is thrown from one side to the other the dash pot controls the time of the transit according to the capacity of the vent-screw to admit air into and out of the cylinder behind the piston therein.

Figure 14:
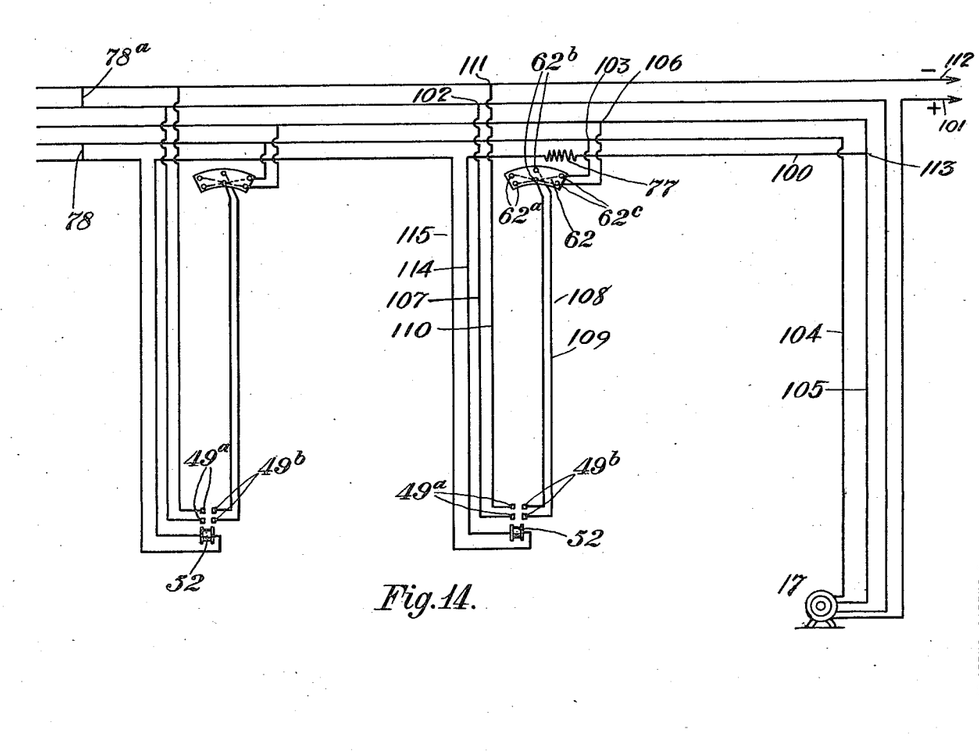
Fig. 14 illustrates a scheme of wiring when electric power is employed.

In Fig. 14 is illustrated diagrammatically the scheme for wiring the shutter or curtain system. So far as the parts already described are shown in this view, they are designated by corresponding characters of reference. It may be noted that the circuit shown at 100 for energizing the electro-magnets 52 is a shunted one and that in said circuit is inserted a resistance 77. In order that the electro-magnet 52 in each of the controllers shall be energized as hereinafter described, they are placed in series in said circuit, the line being permanently closed, as seen at 78, beyond that controller remote from the operating motor. In connection with the diagram Fig. 14 it will be observed that wires connected with the contacts 62ª and 62ᶜ are crossed as indicated by broken lines so that when the circuit-closing contacts of the spider are thrown from one side to the other the direction of the current through the armature is reversed, thereby changing its polarity and the direction of rotation of the armature operated by the magnetic fields which latter remain unchanged. It is obvious that the circuit of the magnetic fields beyond that controller which is remote from the operating motor should also be closed as seen at 78ª.

Referring further to the diagram of wiring shown in Fig. 14 the circuits are traced as follows: From the main conductor 101 the current passes through the fields of motor 17 to junction 102; thence through conductor 107 to lower contact 49ª where the operating switch bridges the current to lower contact 49ᵇ and conductor 108; thence to upper contact 62ᵇ of the reversing switch, the operation of which, as before indicated changes the direction of the current as follows: If the spider be thrown to the right the current is carried to the upper contact 62ᶜ, junction 103, through conductor 104, armature of motor 17, thence back on conductor 105 to junction 106 to the lower contact 62ᶜ of the reversing switch, the spider bridging and carrying the current through conductor 109 to upper contact 49ᵇ which is bridged by the operating switch to upper contact 49ᵃ through conductor 110 to junction 111 and thence through conductor 112. If the spider be thrown to the left the circuit from the upper contact 62ᵇ is bridged to upper contact 62ᵃ and crosses, as indicated by broken lines, to lower contact 62ᶜ to junction 106 through conductor 105 to motor 17 and the armature back to conductor 104 to junction 103 crossing, as indicated by broken lines, to lower contact 62ᵃ where the spider bridges the current to lower contact 62ᵇ thence through conductor 109 to upper contact 49ᵇ where the operating switch bridges it to contact 49ᵃ and thence through conductor 110 to junction 111 and conductor 112. The shunt circuit from junction 113 traverses conductor 100 through resistance 77 conductor 114 magnet 52 conductor 115 to corresponding magnet 52 of an adjoining operating mechanism through closing connection 78 thus completing the circuit from conductor 105 to conductor 104.

The operation, which can be readily gathered from the foregoing description, may be briefly recapitulated thus: Normally the clutches at the upper end of the vertical shafts 29 will be left in neutral position. If the attendant wishes to operate any particular curtain by hand he will turn the member 42—43 to allow the stud-roller 41ᶜ to rest in the seat 42ᵃ, after which the curtain can be raised or lowered by turning the crank 39 in the proper direction. If the attendant wishes to operate the curtain by power he will turn the member 42—43 to allow said stud-roller 41ᶜ to rest in the seat 42ᶜ, which act, as before described, automatically closes the operating circuit, locks the other curtains, and raises or lowers the curtain desired to be operated, according to whether it was up or down at the time the attendant turned member 42—43 to put the stud-roller in said seat 42ᶜ. It will be noted that the operation of a curtain by power does not preclude the simultaneous operation of another curtain by hand. It will also be noted that after the curtain has been raised or lowered by power the member 42—43 returns automatically to the neutral position, that is, to the position where the stud-roller 41ᶜ rests in the seat 42ᵇ, by reason of the action of the weight 45ᵇ augmented by the pressure of the shaft 29 on the relatively inclined edge of the member 42—43 between the seats 42ᶜ and 42ᵇ.

It will be noted that manual operation of a curtain properly operates the circuit reverser for power operation of that curtain in the opposite direction, should the next operation of the curtain be desired to be effected by power. It is not my purpose by the present invention to provide means for operating curtains or shutters simultaneously, but to provide a common source of power from which one curtain or shutter or a plurality of them may be operated independently of the other or others, or as herein set forth.

The application for this patent is a division of that filed by me on March 4, 1908, Serial Number 419,211.

What I claim is:

1. In combination with a plurality of curtains, an electrically-operated power shaft common to the curtains, means whereby each of said curtains may be independently raised or lowered by said shaft, and electrically operable means for locking the curtain or curtains not operated by the shaft.

2. The combination with a plurality of curtains, a power shaft common to the curtains, an electric motor for operating said shaft, means whereby each of said curtains may be raised or lowered independently of the others by said shaft, separate means in connection with each of said curtains for reversing the circuits to said motor, and manually operable means for closing the operating circuit through said motor.

3. In combination with a curtain, a power shaft for operating the same, an electric motor for operating said shaft, means whereby said curtain may be either raised or lowered by said shaft, means in connection with said curtain automatically operated for reversing the circuits to the motor, and manually operable means for closing the operating circuit through said motor.

4. In combination with a plurality of curtains, a power shaft common to the curtains, an electric motor for operating said shaft, means whereby each of said curtains may be either raised or lowered by said shaft, means in connection with each of said curtains automatically operated for reversing the circuits to the motor, and manually operable means for closing the operating circuit through said motor.

5. In combination with a plurality of curtains, a power shaft common to the curtains, an electric motor for operating said shaft, means whereby each of said curtains may be either raised or lowered by said shaft, means in connection with each of said curtains for reversing the circuits to said motor, electrically operated devices in connection with each of said curtains for locking it from operation, a shunt circuit for operating said devices, and manually operable means for closing the operating current through said motor to operate a curtain and operating the shunt circuit to lock from operation the other curtain or curtains.

6. In combination with a curtain and roller therefor, an electric motor, means for transmitting power from the motor to the curtain roller, a circuit closing switch for starting said motor, means for holding said switch in circuit closing position until the circuit is broken, a motor reversing switch and means for operating the latter to automatically open the circuit as the curtain nears the limit of its travel and means for delaying the circuit closing operation of said motor reversing switch until the starting switch is open.

7. In combination with a curtain and roller therefor, a power shaft, an electric motor for driving the power shaft, means for transmitting power from the power shaft to the curtain roller, a clutch for rendering said power-transmitting means operative, means for causing the engagement of said clutch, and common means for starting the motor and causing the subsequent engagement of said clutch.

8. In combination with a curtain and roller therefor, an electric motor, means for transmitting power of said motor to the curtain roller, an electric circuit having therein the motor, a starting switch, an automatically operable breaking and reversing switch, and a shunt circuit having therein an electro-magnet for holding the starting switch closed until the circuit is broken by the automatic switch.

9. In combination with a plurality of curtains and rollers therefor, an electric motor, means for transmitting power from the motor to operate any of the curtain rollers, a circuit switch for each of said curtains for starting said motor, means for holding said switch closed until the circuit is broken, a motor reversing switch and means for operating the same automatically as the curtain nears the limit of its travel, said switch opening and closing the circuit, and means for delaying the closing action of said switch until the starting switch is open.

10. In combination with a plurality of curtains and rollers therefor, a power shaft common to said curtains and rollers, an electric motor for driving said shaft, means for transmitting power from said shaft to each of the rollers, clutches for rendering said power-transmitting means operative, means for effecting the engagement of the clutches, circuit closing means, and common means for starting the motor and causing the engagement of the clutches.

11. In combination with a plurality of curtains and rollers therefor, a power shaft common to said curtains and rollers, an electric motor, means for transmitting power of said motor to the curtain rollers, an electric circuit for each of the curtains having therein the motor, a starting switch for said circuits, an automatically-operable breaking and reversing switch for said circuits, and a shunt circuit having therein an electro-magnet for holding the starting switch closed until the circuit is broken by said automatic breaking and reversing switch.

12. In combination with a plurality of curtains and rollers therefor, an electric motor, means for transmitting power from said motor to any of the curtains, independently of the others, means for starting said motor and means for precluding the operation of such curtains as are not desired to be operated, and means for automatically stopping the motor when the operated curtain reaches the limit of its travel.

13. In combination with a plurality of curtains and rollers therefor, an electric motor, means for transmitting power from said motor to any of the curtains, means for starting said motor, means automatically operative for breaking and reversing the operating circuit, and adjustable means for timing said automatically-operative means, and means for automatically opening the motor circuit prior to the reversal of said circuit.

EDWARD H. McCLOUD.

Witnesses:
BENJ. FINCKEL,
MAYME FOARD.